United States Patent
Bentley

(10) Patent No.: US 6,974,348 B2
(45) Date of Patent: Dec. 13, 2005

(54) HIGH-DENSITY MULTI-PORT-MODULE PATCH PANEL SYSTEM

(75) Inventor: Darrell Bentley, Richardson, TX (US)

(73) Assignee: CommScope Solutions Properties, LLC., Sparks, NV (US)

(*) Notice: Subject to any disclaimer, the term of this patent is extended or adjusted under 35 U.S.C. 154(b) by 0 days.

(21) Appl. No.: 10/791,812

(22) Filed: Mar. 4, 2004

(65) Prior Publication Data

US 2005/0197005 A1     Sep. 8, 2005

(51) Int. Cl.[7] ............................................. H01R 13/60
(52) U.S. Cl. ................................................. 439/540.1
(58) Field of Search .................. 439/540.1, 541.5, 439/716, 701, 142, 715, 676, 215; 385/135, 385/136, 153, 134; 206/565, 557; 174/99 R, 174/48, 101

(56) References Cited

U.S. PATENT DOCUMENTS

| | | | |
|---|---|---|---|
| 4,824,196 A | * | 4/1989 | Bylander ..................... 385/134 |
| 5,011,257 A | * | 4/1991 | Wettengel et al. ............ 385/53 |
| 5,127,082 A | * | 6/1992 | Below et al. ................ 385/135 |
| 6,424,781 B1 | * | 7/2002 | Puetz et al. ................. 385/135 |
| 6,761,585 B2 | * | 7/2004 | Clark et al. ............. 439/540.1 |

* cited by examiner

*Primary Examiner*—Alex Gilman
(74) *Attorney, Agent, or Firm*—Birch, Stewart, Kolasch & Birch, LLP

(57) ABSTRACT

A high-density multi-port-module patch panel system includes angled multi-port modules. The system accommodates a high density of cable connections, while also providing effective cable management without increasing the maintenance costs or sacrificing the network performance. The angled multi-port modules exert less stress on the connectors and portions of the cabling adjacent to the connectors. Further, the angled arrangement provides a neater arrangement, and better facilitates maintenance and service procedures by providing improved visibility of labeling surfaces.

23 Claims, 5 Drawing Sheets

HIGH-DENSITY MULTI-PORT-MODULE PATCH PANEL SYSTEM

BACKGROUND OF THE INVENTION

1. Field of the Invention

The present invention generally relates to a cable patch panel, and more particularly, to a high-density multi-port-module patch panel system for use in the telecommunications industry.

2. Description of the Background Art

In the telecommunications industry, use of cable patch panels with multi-port modules is rapidly growing. Although good cable management may not positively enhance network performance, poor cable management will increase the maintenance costs and indirectly detract from the network performance.

Due to limited space in telecommunication closets, there is a continuous need for maintaining a high-density cable patch panel to accommodate more cables such as electrical cables, telephone cables, network cables, fiber optics, etc. However, the conventional patch panel requires additional space for horizontal cable managers, which causes a lower port density for cable connections.

Therefore, there is a need in the art for a high-density cable patch panel, which can accommodate more cables while also providing an effective cable management without increasing the maintenance costs or sacrificing the network performance.

SUMMARY OF THE INVENTION

The present invention fulfills the aforementioned need in the art by providing a high-density multi-port module system. The high-density multi-port module system comprises a rack having a first rail and a second rail; a patch panel frame mounted on the rack; a first plurality of vertical multi-port modules juxtaposed in the patch panel frame at a first angle, relative to normal of the patch panel frame, toward the first rail of the rack; a second plurality of vertical multi-port modules juxtaposed in the patch panel frame at a second angle, relative to normal of the patch panel frame, toward the second rail of the rack; and a first vertical cable manager on the first rail of the rack and a second vertical cable manager on the second rail of the rack, the first and the second vertical cable managers holding cables connected to the first or the second plurality of multi-port modules, respectively.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE PREFERRED EMBODIMENTS

Figure 1:
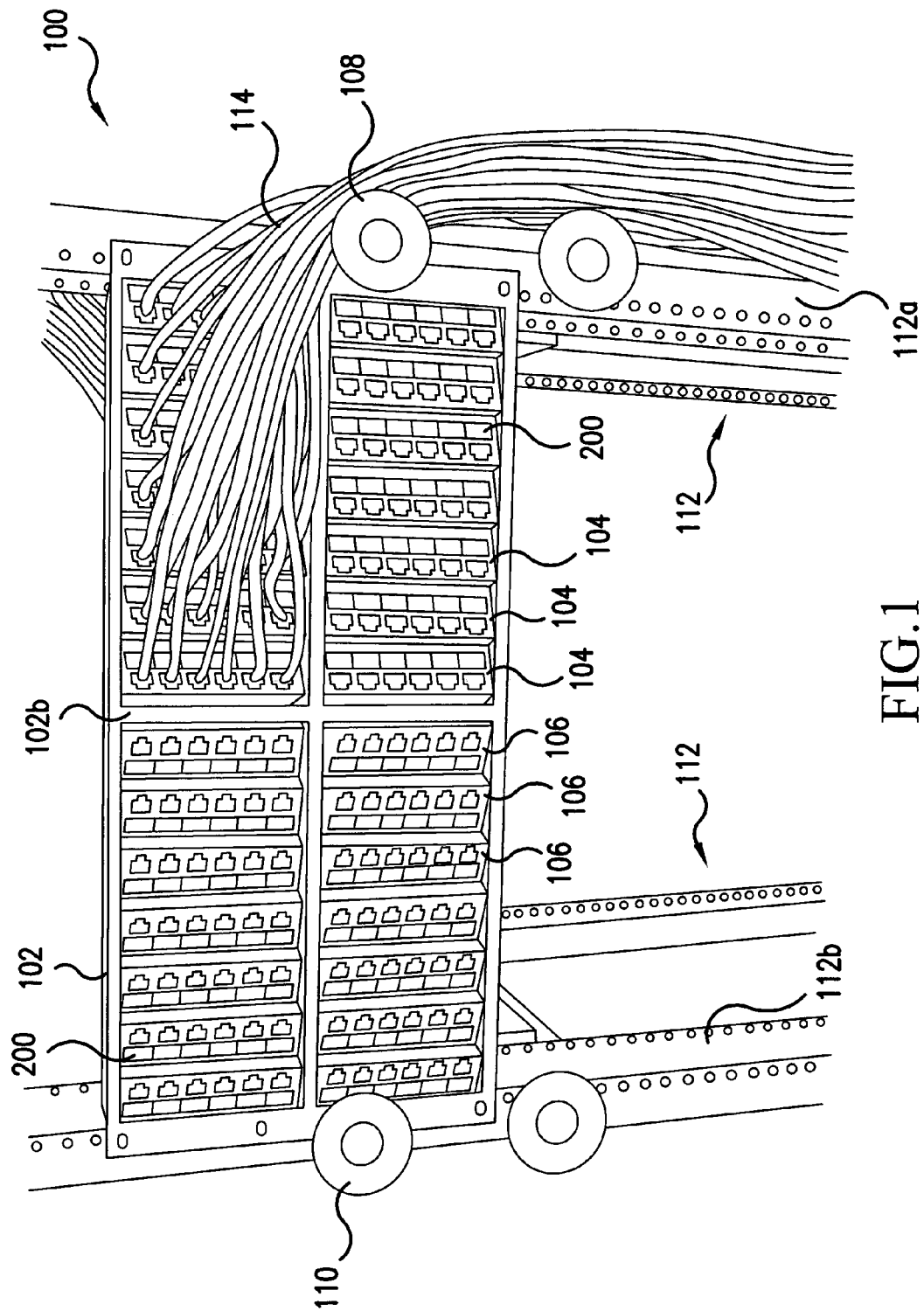
FIG. 1 is a perspective view of the high-density multi-port-module patch panel system, in accordance with one embodiment of the present invention.

FIG. 1 is a perspective view of the high-density multi-port-module patch panel system 100 in accordance with one embodiment of the present invention. The high-density multi-port-module patch panel system 100 comprises a rack 112 having a first or right rail 112a and a second or left rail 112b and a patch panel frame 102 mounted on the rack 112. The patch panel frame 102 includes the first plurality of vertical multi-port modules 104 and the second plurality of vertical multi-port modules 106. However, it should be noted that the multi-port modules 104 and 106 could be horizontal multi-port modules. The patch panel frame 102 has a front face 102a, which resides in a plane that is substantially parallel with a plane defined by the right rail 112a and the left rail 112b of the rack 112.

In the embodiment shown in FIG. 1, the patch panel frame 102 is a two-tier patch panel frame, i.e., the frame includes two rows of multi-port modules 104 and 106. However, it should be noted that the patch panel frame 102 could be a one-tier patch panel frame (i.e., only one row of multi-port modules 104 and 106) to accommodate less modules. Alternatively, the patch panel frame 102 could have more than two rows of multi-port modules 104 and 106. Moreover, it should be noted that although the frame may have room for two or more rows of multi-port modules that only one row may be populated. One or more rows may be left empty and accommodate further expansion when additional multi-ports are required.

The high-density multi-port-module patch panel system 100 also comprises a first vertical cable manager 108 on the right rail 112a of the rack 112 and a second vertical cable manager 110 on the left rail 112b of the rack 112. The first and the second vertical cable managers 108 and 110 hold cables 114 connected to the first and the second plurality of multi-port modules 104 and 106, respectively. In the embodiment shown in FIG. 1, the vertical cable managers are 4-inch CPI cable distribution spools. If only a one-tier patch panel frame (i.e., only one row of multi-port modules) is mounted on the rack 112, one spool on each side of the rack 112 would be enough to hold the cables 114. In a two-tier patch panel frame, two spools on each side of the rack 112 are preferred to avoid overloading of cables on an individual spool.

Figure 2:
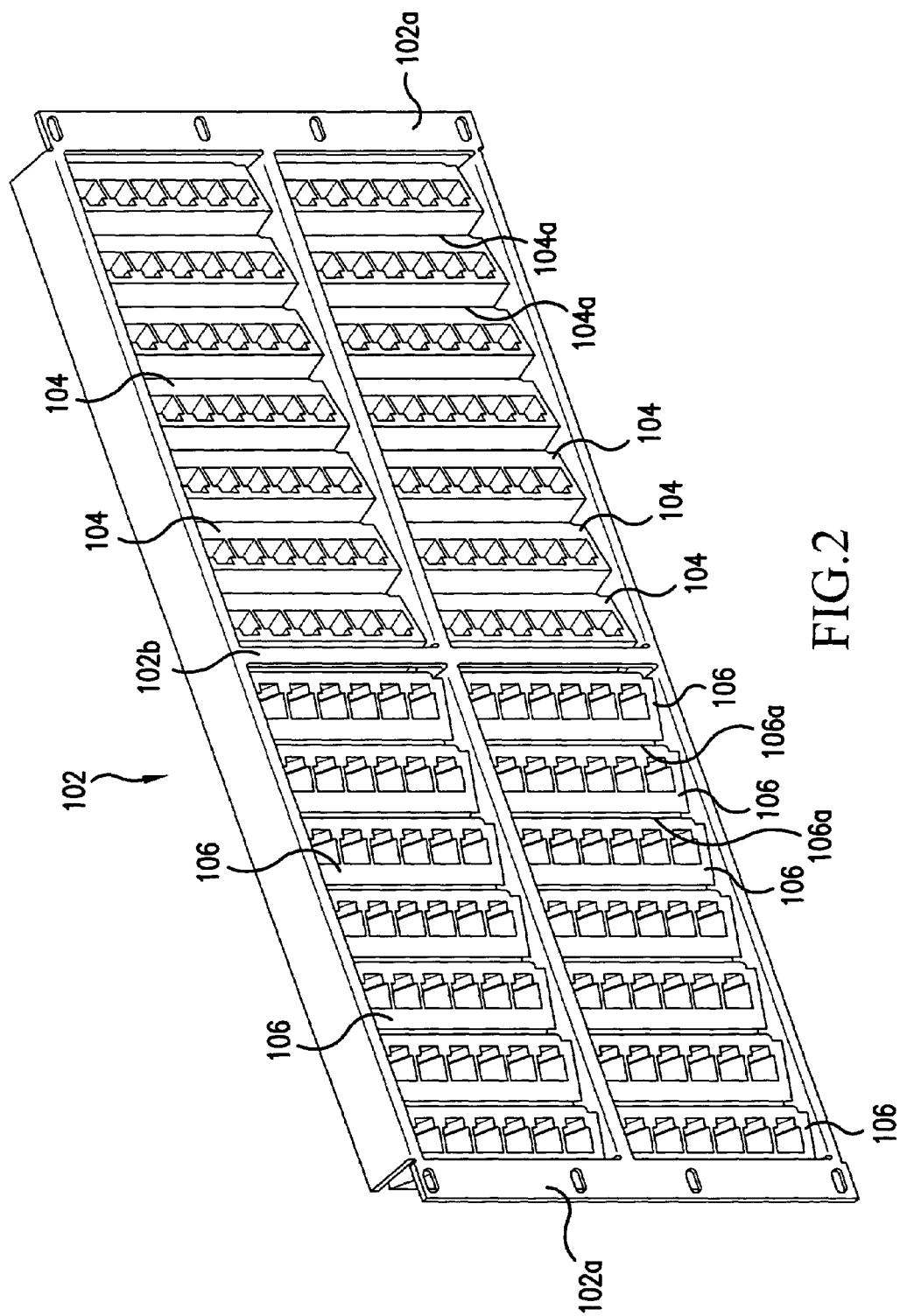
FIG. 2 is a close-up perspective view of the high-density multi-port-module patch panel of FIG. 1.

FIG. 2 is a close-up perspective view of the high-density patch panel with multi-port modules of FIG. 1, removed from the rack 112. In one embodiment of the present invention, the patch panel frame 102 is made of a light-weight steel sheet, and the patch panel frame 102 includes a steel vertical reinforcement bar 102b to provide stiffening and structural integrity. The first plurality of multi-port modules 104 are juxtaposed in the patch panel frame 102 to the right of the reinforcement bar 102b. The ports of the first plurality of multi-port modules 104 are directed at a first angle, relative to a normal line extending away from the front face 102a, toward the right rail 112a of the rack 112. The second plurality of multi-port modules 106 are juxtaposed in the patch panel frame 102 to the left of the reinforcement bar 102b. The ports of the second plurality of multi-port modules 106 are directed at a second angle, relative to a normal line extending away from the front face 102a, toward the left rail 112b of the rack 112. The ports may be directed at the first or second angle by angling the modules 104 or 106, or by having the ports formed at an angle within the module 104 or 106. Furthermore, as mention previously, the multi-port modules 104 and 106 could be horizontal multi-port modules, wherein the ports are angled at the first or second angle.

In one embodiment of the present invention, the first angle ranges from approximately ten degrees to approximately forty-five degrees. The second angle also ranges from approximately ten degrees to approximately forty-five degrees. The first and second angles are preferably the same. However, the first and second angles can be different based on the individual applications of the present invention. In the embodiment shown in FIG. 2, the first angle and the second angle are approximately twenty degrees and are symmetrical to a normal line, which extends away from the front face 102a of the patch panel frame 102 at ninety degrees.

The first plurality of multi-port modules 104 are positioned on the right side of the patch panel frame 102 adjacent to the first cable manager 108. The second plurality of multi-port modules 106 are positioned on the left side of the patch panel frame 102 adjacent to the second cable manager 110. The first plurality of multi-port modules 104 and the second plurality of multi-port modules 106 are illustrated as being juxtaposed in the patch panel frame, but may be slightly spaced apart in their adjacent state. Furthermore, each of the multi-port modules has a ridge 104a or 106a. A plane defined by the ridges 104a and a plane defined by the ridges 106a are parallel to the front face 102a of the patch panel frame 102.

By mounting the multi-port modules 104 and 106 at the first and second angles, one can conduct or direct the cables 114 toward the cable managers 108 and 110, respectively. Therefore, the angled modules 104 and 106 exert less stress on the jacks and the portions of the cables 114 near the jacks, as compared to cables 114 connected to the modules at ninety degrees relative to the frame 102. Furthermore, the angled arrangement makes the technician's job easier to manage the cables, because the existing cables do not block the labels 200 on the modules, the technician can easily identify a specific cable and plug or unplug a cable into the identified port, without removing other cables.

In one embodiment of the present invention, the first and second plurality of multi-port modules 104 and 106 are standard "1100 series" modules, which have six ports. However, the present invention can be used in conjunction with other known or custom designed multi-port modules. Furthermore, the first and second modules do not have to be the same type of modules. It is within the scope of the invention to employ different types of modules for the first and second modules based upon the user's needs.

In the embodiment shown in FIG. 2, the patch panel frame 102 can accommodate twenty-eight of the "1100 series" type modules, each of which has six ports; i.e., there is a one hundred and sixty eight port capacity for cable connection in a 5 U sized patch panel frame. This would provide a 33.6 ports per U density. Such a 33.6 ports per U density is a higher density, as compared to conventional designs. Further, this higher density layout is accomplished in an environment, which provides improved strain relief on the connectors, better visibility of labeling, and a neater appearance.

Figure 3:
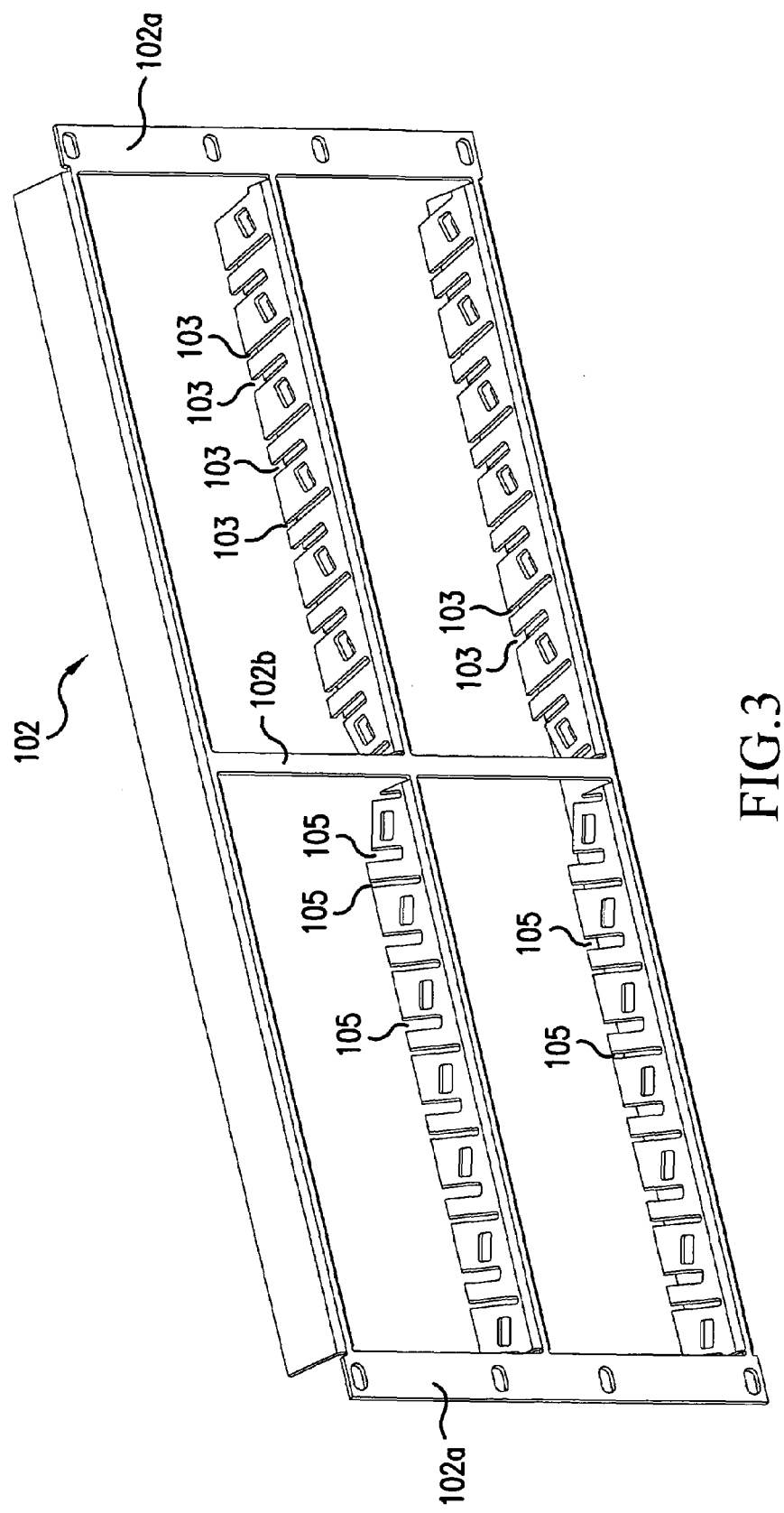
FIG. 3 is a perspective view of a frame of the high-density multi-port-module patch panel of FIG. 2.

FIG. 3 is a perspective view of the frame of the high-density patch panel of FIG. 2. As shown in FIG. 3, the patch panel frame 102 comprises slots 103 configured at the first angle, and slots 105 configured at the second angle to accommodate the first and the second plurality of multi-port modules 104 and 106, respectively. The slots 103 are configured to allow only one-way insertion of the multi-port modules 104 and 106. The slots 103 and 105 lock the first and the second plurality of multi-port modules 104 and 106, after the first and the second plurality of multi-port modules 104 and 106 are engaged in the slots 103 and 105.

Figure 4:
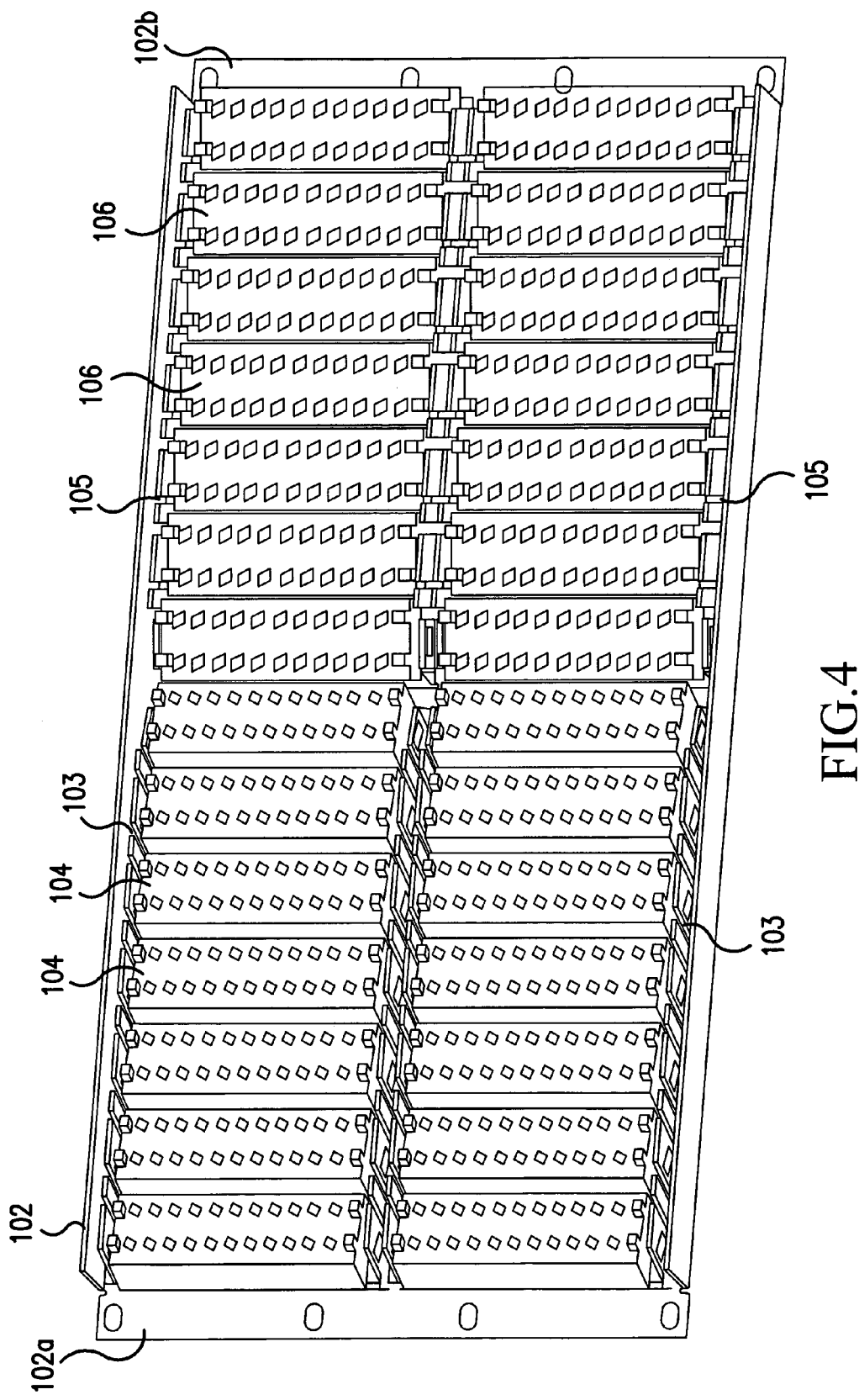
FIG. 4 is a back view of the high-density multi-port-module patch panel of FIG. 2.

FIG. 4 is a back view of the high-density multi-port-module patch panel of FIG. 2. The backs of the multi-port modules 104 and 106 include connectors for connection to wires, which are in turn connected to various system devices (not shown), such as devices associated with a network system, a telephone exchange system, etc. The connection of wires to the backs of the modules may be accomplished by wire wrapping of terminals, or insulation displacement connectors (IDCs) or any other type of connectors.

Figure 5:
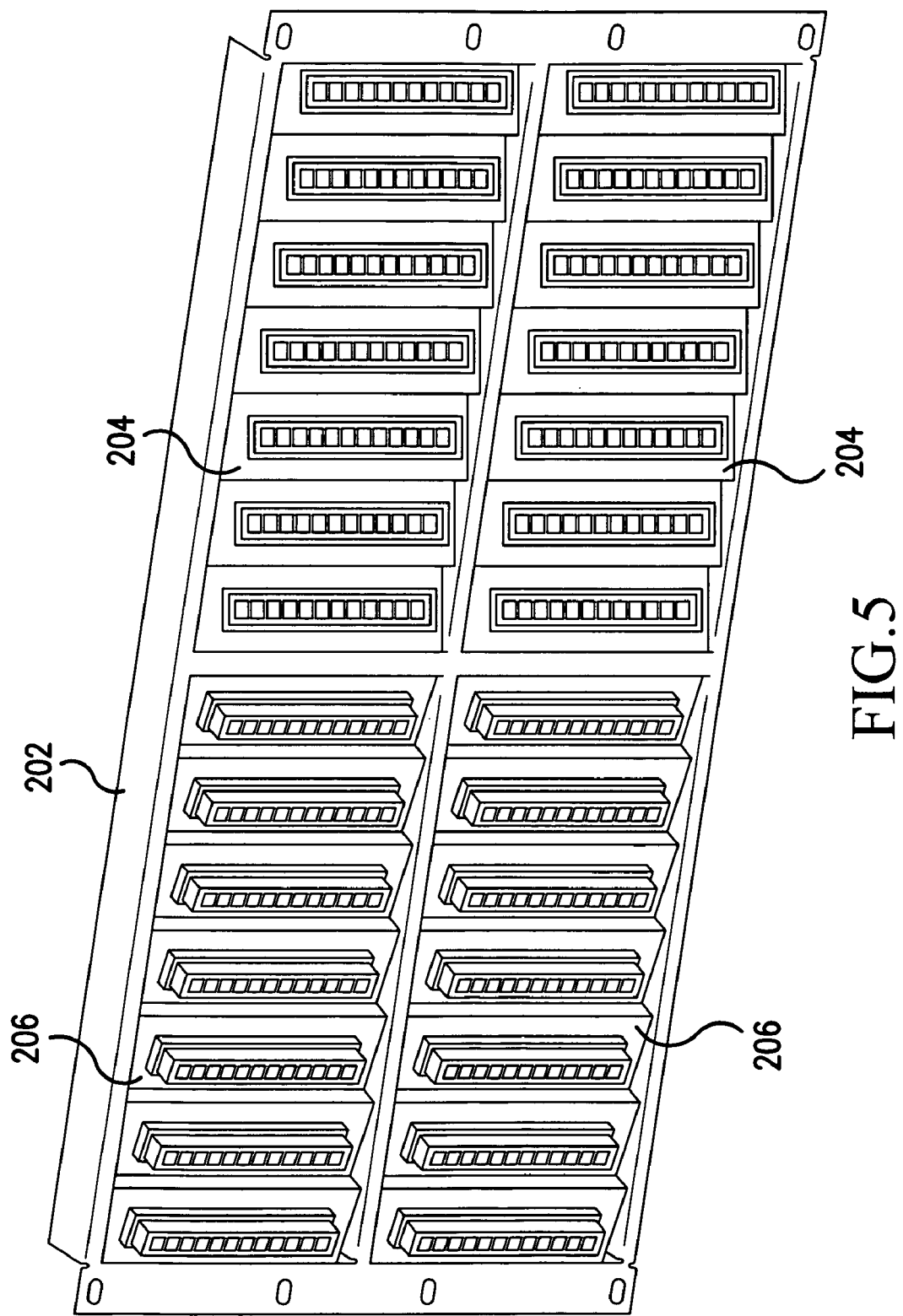
FIG. 5 is a perspective view of a high-density multi-port-module patch panel for use with fiber optic cables, in accordance with another embodiment of the present invention.

The present invention also can be applied to different cable patch panel systems such as electrical cables, telephone cables, and/or network cables of the electrical or fiber optic types. For example, FIG. 5 is a perspective view of the high-density patch panel frame 202 employing fiber optics modules 204 and 206, in accordance with another embodiment of the present invention.

Accordingly, the high-density patch panel system of the present invention provides a higher port density than conventional patch panel systems because additional space for the horizontal cable manager is not required in the present invention. The present invention also effectively reduces the stress imposed on the cables and connectors adjacent to jacks, and facilitates the technician's management and maintenance.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A high-density multi-port-module patch panel system, comprising:
    a rack having a first rail and a second rail;
    a patch panel frame mounted to the rack, the patch panel frame having a front face substantially residing in a first plane;
    a first plurality of multi-port modules mounted to the patch panel frame, the ports of the first plurality of multi-port modules opening in a direction which is at a first angle, relative to a normal line extending away from the first plane, such that the ports of the first plurality of multi-port modules open toward the first rail of the rack; and
    a second plurality of multi-port modules mounted to the patch panel frame, the ports of the second plurality of multi-port modules opening in a direction which is at a second angle, relative to a normal line extending away from the first plane, such that the ports of the second plurality of multi-port modules open toward the second rail of the rack, wherein the patch panel frame comprises slots configured at a third angle and a fourth angle to accommodate the first and the second plurality of multi-port modules, respectively.

2. The high-density multi-port-module patch panel system of claim 1, wherein each of the first and the second plurality of multi-port modules have plural ports for accepting an electrical connector.

3. The high-density multi-port-module patch panel system of claim 1, wherein each of the first and the second plurality of multi-port modules have plural ports for accepting an optical connector.

4. The high-density multi-port-module patch panel system of claim 1, wherein each of the first and the second plurality of multi-port modules have plural ports arrayed in a vertical column.

5. The high-density multi-port-module patch panel system of claim 1, wherein the first plurality of multi-port modules are located side-by-side in the patch panel frame, and the second plurality of multi-port modules are located side-by-side in the patch panel frame.

6. The high-density multi-port-module patch panel system of claim 1, wherein the patch panel frame includes a centrally located reinforcement bar, and the first plurality of multi-port modules are positioned between the reinforcement bar and the first rail, and the second plurality of multi-port modules are positioned between the reinforcement bar and the second rail.

7. The high-density multi-port-module patch panel system of claim 1, wherein the first plane is co-planer with a second plane containing the first and the second rails of the rack.

8. The high-density multi-port-module patch panel system of claim 1, wherein each of the multi-port modules has a plurality of ports and a plurality of label surfaces adjacent to the plurality of ports.

9. The high-density multi-port-module patch panel system of claim 1, wherein the slots are configured to allow only one-way insertion of the multi-port modules.

10. The high-density multi-port-module patch panel system of claim 1, wherein the patch panel frame comprises openings adjacent to the slots to lock the multi-port modules to the patch panel frame after the multi-port modules are fully inserted in the slots.

11. The high-density multi-port-module patch panel system of claim 1, wherein the patch panel frame is formed of sheet metal.

12. The high-density multi-port-module patch panel system of claim 1, wherein the third angle is the same as the first angle of the first plurality of multi-port modules, and the fourth angle is the same as the second angle of the second plurality of multi-port modules.

13. The high-density multi-port-module patch panel system of claim 1, further comprising:
a first cable manager on the first rail of the rack and a second cable manager on the second rail of the rack, the first and the second cable managers holding cables connected to the first and the second plurality of multi-port modules, respectively.

14. The high-density multi-port-module patch panel system of claim 13, wherein the first vertical cable manager and the second vertical cable manager are spools.

15. A high-density multi-port-module patch panel for attachment to a rack having at least first and second rails, the patch panel comprising:
a patch panel frame having a front face substantially residing in a first plane;
a first plurality of multi-port modules mounted to the patch panel frame, the ports of the first plurality of multi-port modules opening in a direction which is at a first angle, relative to a normal line extending away from the first plane, such that the ports of the first plurality of multi-port modules would open toward the first rail of the rack when the patch panel frame is attached to the rack; and
a second plurality of multi-port modules mounted to the patch panel frame, the ports of the second plurality of multi-port modules opening in a direction which is at a second angle, relative to a normal line extending away from the first plane, such that the ports of the second plurality of multi-port modules would open toward the second rail of the rack when the patch panel is attached to the rack, wherein the patch panel frame comprises slots configured at a third angle and a fourth angle to accommodate the first and the second plurality of multi-port modules, respectively.

16. The high-density multi-port-module patch panel of claim 15, wherein each of the multi-port modules has a plurality of ports and a plurality of label surfaces adjacent to the plurality of ports.

17. The high-density multi-port-module patch panel of claim 15, wherein the slots are configured to allow only one-way insertion of the multi-port modules.

18. The high-density multi-port-module patch panel of claim 15, wherein the patch panel frame comprises openings adjacent to the slots to lock the multi-port modules to the patch panel frame after the multi-port modules are fully inserted in the slots.

19. The high-density multi-port-module patch panel of claim 15, wherein the third angle is the same as the first angle of the first plurality of multi-port modules, and the fourth angle is the same as the second angle of the second plurality of multi-port modules.

20. A method of organizing cabling in a high-density multi-port-module patch panel system, comprising the steps of:
providing a rack, the rack having a first rail and a second rail;
attaching a patch panel frame to the rack, the patch panel frame having a front face substantially residing in a first plane;
attaching a first plurality of multi-port modules to the patch panel frame, ports of the first plurality of multi-port modules opening in a direction which is at a first angle, relative to a normal line extending away from the first plane, such that the ports of the first plurality of multi-port modules open toward the first rail of the rack;
connecting a first cable to a port of the first plurality of multi-port modules;
attaching a second plurality of multi-port modules to the patch panel frame, the ports of the second plurality of multi-port modules opening in a direction which is at a second angle, relative to the normal line extending away from the first plane such that the ports of the second plurality of multi-port modules open toward the second rail of the rack; and
connecting a second cable to a port of the second plurality of multi-port modules, wherein said steps of attaching the first and second plurality of multi-port modules to the patch panel frame include inserting the first and second plurality of multi-port modules into slots formed in the patch panel frame, wherein the slots are configured at third angles and fourth angles to accommodate the first and the second plurality of multi-port modules, respectively.

21. The method of organizing cabling in a high-density multi-port-module patch panel system of claim 20, further comprising the step of:
providing a first cable manager on the first rail of the rack; and
routing the first cable over the first cable manager.

22. The method of organizing cabling in a high-density multi-port-module patch panel system of claim 21, further comprising the step of:
providing a second cable manager on the second rail of the rack; and
routing the second cable over the second cable manager.

23. The method of organizing cabling in a high-density multi-port-module patch panel system of claim 20, wherein the third angle is the same as the first angle of the first plurality of multi-port modules, and the fourth angle is the same as the second angle of the second plurality of multi-port modules.

* * * * *